United States Patent Office 3,594,202
Patented July 20, 1971

3,594,202
ASPHALTIC COMPOSITIONS
Luke W. Corbett, Mountainside, and Robert E. Swarbrick, Belle Mead, N.J., assignors to Esso Research and Engineering Company
No Drawing. Filed May 17, 1966, Ser. No. 550,644
Int. Cl. C08h 13/00, 17/22
U.S. Cl. 106—278  13 Claims

ABSTRACT OF THE DISCLOSURE

Asphaltic compositions comprising admixtures of asphaltenes and high boiling ester plasticizers, e.g., diisodecyl phthalates, have the unusual combination of properties including excellent temperature susceptibility, high viscosity and good resistance to aging and hardening.

This invention relates to improved asphaltic compositions and the preparation thereof, and more particularly to asphaltic compositions having the unusual combination of properties including excellent temperature susceptibility, high viscosity and good resistance to aging and hardening. The invention especially relates to asphaltic compositions comprising asphaltenes and organic plasticizers.

A number of techniques are known for producing asphalts of varying physical properties from petroleum crudes. These include straight reduction, steam distillation, vacuum flashing, air blowing, and blending. Blended asphalts are frequently prepared by (a) blending residua from two or more crudes, (b) blending hard and soft residua to obtain intermediate consistencies, (c) blending hard residua with less volatile cutter stocks, (d) blending crude residua with propane precipitated asphalts, (e) blending extraneously obtained asphaltenes with asphalt and (f) other combinations of the foregoing.

In general, the asphaltic compositions obtained by conventional processing methods do not have the combination of properties which are afforded by the compositions of this invention. For example, the hardness of a straight run asphalt may be greatly increased by extensive steam or vacuum distillation of the asphalt, but the resulting product in this instance is generally more susceptible to temperature changes. The air blowing technique, in comparison with the vacuum distillation method, is capable of producing an asphaltic product having improved temperature susceptibility characteristics but which is deficient in other properties such as ductility and aggregate adhesion. Similarly, the blending technique has heretofore produced asphaltic compositions which are deficient in one or more of the properties recited above.

The principal objective of this invention is to provide asphaltic compositions having unusual properties; in particular, asphalts having very good temperature susceptibility coupled with high viscosity and good resistance to aging and hardening. Applications in which this unusual combination of characteristics is particularly desirable include the construction of canal linings and built-up roofs by the lamination of saturated felts with hot asphalt; the manufacture of asphalt shingles, roll roofing, siding, laminated papers and fabrics, insulation backing, asphalt tile and similar materials; and the preparation of culking compounds, electrical insulating materials, water-proofing compounds, rubberized compositions and other formulations.

The present invention provides a class of new and improved asphaltic compositions which are not subject to many of the limitations and disadvantages of petroleum asphalts which have been available heretofore. In accordance with the invention, it has now been discovered that asphaltic compositions comprising asphaltenes and conventional organic plasticizers have unusual properties that make them highly desirable in many asphalt applications.

The asphaltenes are the highly aromatic, high molecular weight constituents contained in most petroleum residuum and especially in an asphalt-bearing residua. Typical properties of these materials are well-known in the art, e.g., U.S. Pat. 3,093,573 which is incorporated herein by reference. Asphaltenes are generally prepared by contacting an asphalt-bearing residuum with a precipitant, e.g., a $C_5$–$C_9$ n-paraffin, which causes the asphaltenes to precipitate out as solids and by subsequently removing these solids by filtration or centrifugation, preferably the latter. A fuller desicrption of a method for recovering asphaltenes is given in U.S. Pat. 3,087,887 which is incorporated herein by reference. Nonlimiting examples of residua suitably employed to produce these asphaltenes are derived from Lagunillas, Tia Juana, Boscan, Aramco, Talco, Kuwait, Oregon Basin, Lloydminister, Santa Maria, Kern River and Eucutta crudes. A typical material of the kind described above is a Lagunillas asphaltene fraction having the properties shown in the following table.

TABLE I

General characterization of Lagunillas asphaltenes

| Elemental analysis: | Wt. percent |
|---|---|
| Carbon | 84.68 |
| Hydrogen | 8.71 |
| Sulfur | 3.85 |
| Nitrogen | 1.24 |
| Oxygen | 1.26 |
| Metals (Ni, V, Fe) | 0.23 |
| Densimetric analysis:[1] | |
| Molecular weight | 3390 |
| Density 20/4° | 1.092 |
| Percent aromatic carbon | 49 |
| Condensation index | .29 |
| Number carbon atoms | 239 |
| Number aromatic carbons | 116 |
| Number rings, aromatic | 28.6 |
| Number rings, naphthenic | 6.8 |

[1] Analytical Chemistry 36, 1967–1971 (1964).

The organic plasticizers which are effective to attain the objectives of the invention include the nonvolatile organic liquids which are commonly used to plasticize and soften synthetic vinyl resins such as, for example, polyvinyl chloride. In general, these materials have a COC flash point above 350° F., preferably above 400° F., and may comprise, for example, the $C_4$–$C_{16}$ aliphatic and aromatic alcohol esters of a $C_4$–$C_{10}$ dibasic acid such as phthalic acid, adipic acid, sebacic acid, succinic acid, pimalic acid, and the like. Other plastisizers well-known and useful herein include the $C_6$–$C_{16}$ alcohol esters of phosphoric acid, preferably the aryl phosphate esters. It is especially preferred, however, that the plasticized be an ester of phthalic acid with a $C_8$–$C_{14}$ aliphatic monohydric alcohol and mixtures thereof. Specific examples of suitably employed plasticizers include di-n-butyl phthalate, di-n-hexyl phthalate, di-2-ethylhexyl phthalate, diisooctyl phthalate, di-n-decyl phthalate, diisodecyl phthalate, di-n-dodecyl phthalate, ditridecyl phthalate, diphenyl phthalate, di(n-octyl, n-decyl) phthalate, oxo-bottom phthalate ($C_{10}$+mixed alcohols), tricresyl phosphate, triphenyl phosphate, diisooctyl adipate, diisodecyl adipate, diisooctyl sebacate, diisodecyl sebacate, and the like.

The blending of the components of the present invention is carried out under conditions such that the solid asphaltenes and the organic plasticizers are combined to form a homogeneous mass. In most cases, it will be necessary to admix these materials at a temperature within the range of between about 300° and about 400° F. Temperatures below about 200° F. are generally not sufficient to promote fusion of the ingredients while temperatures above about 450° F. are unnecessary. Temperatures between about 350° F. and about 400° F. have been found to be most effective and are therefore preferred. Blending can be accomplished by admixing the materials in a number of various mixing devices. Specific examples of suitable mixing devices include a paddle mill, an attrition mill, a spiral blade mixer, and the like. The admixing time may range from a few minutes to an hour or more, depending upon the temperature, the composition to be blended and the type of admixing equipment employed.

Broadly, this invention comprises from about 40 to about 80 wt. percent of asphaltenes and from about 20 to about 60 wt. percent of an organic plasticized. A preferred composition, however, comprises from about 45 to about 70 wt. percent of asphaltenes and from about 30 to about 55 wt. percent organic plasticized. For example, a composition comprising from about 45 to about 55 wt. percent of asphaltenes and from about 45 to about 55 wt. percent organic plasticized has been found to be especially effective as a hot-mix paving binder.

The admixture as asphaltenes and the organic plasticizer is found compatible with other materials commonly used in asphalt compositions and may be blended successfully with various amounts of materials such as asbestos, rubber, and mineral fillers. Mineral aggregate (e.g., stone, sand, and mineral dust) can be admixed with minor amounts of the components of this invention to yield a hot-mix asphalt paving. For example, a hot-mix asphalt paving composition comprises from about 4 to about 10 wt. percent, preferably 5 to 8 wt. percent, of the aforedescribed asphaltene-plasticizer hot-mix paving binder and from about 90 to about 96 wt. percent mineral aggregate, preferably 92 to 95 wt. percent. Specific examples of other materials which may be admixed are asphalt cements, and coal tar cements of suitable consistency.

The invention can be more fully understood by reference to the following examples.

EXAMPLE 1

This example illustrates the superior properties of asphaltic compositions prepared in accordance with this invention.

Asphaltenes and a conventional vinyl resin plasticizer, i.e., diisooctyl phthalate, were admixed to produce the compositions defined and compared below in Table II. The asphaltenes used herein were the solid precipitate recovered from the admixture of 15 parts by volume of normal heptane and one part of Lagunillas flux residuum. The high quality and utility of these asphaltene-plasticizer compositions are demonstrated in the following comparisons (Table II) with asphalt paving binders from Lagunillas and Elk Basin crude sources, each of which have been used for many years in the manufacture of specification paving binders. These two asphalts were prepared by straight reduction of the aforementioned crudes under vacuum distillation conditions.

From the data in Table II, the marked superiority of the asphaltene-plasticizer blends is readily apparent. In other words, compared to conventional asphalts, the asphaltic compositions of this invention have a higher level of temperature susceptibility (penetration ratio), a higher viscosity (Furol Viscosity at 275° F.) and improved resistance to aging and hardening (TFR, percent original penetration).

EXAMPLE 2

A hot-mix asphalt paving was prepared by admixing the 90 penetration diisooctyl phthalate-asphaltene composition from Example 1 with 93.5 wt. percent of a mineral aggregate meeting the New Jersey Highway Department standard specification for surface pavement courses and identified as FABC–1 (Fine Aggregate Bituminous Concrete). Similarly, the 90 penetration Lagunillas, Venezuela binder of Example 1 was admixed with 93.5 wt. percent of the aforementioned mineral aggregate. Marshall briquets prepared from the foregoing materials were tested and the results were as follows:

TABLE III.—MARSHALL TEST METHOD [1]

| Marshall briquet properties | Asphaltene-DIOP binder | Lagunillas binder | Typical specification for asphalt paving |
|---|---|---|---|
| Stability at 140° F., lbs | 2,340 | 1,600 | 750+ |
| Flow at 140° F., .01″ | 16 | 13 | 8–18 |
| Voids, vol. percent | 3.4 | 3.5 | 2–5 |

[1] ASTM D 1559–62T.

It is readily seen from the above data that the asphaltic compositions of this invention function as effective asphalt paving binders.

EXAMPLE 3

As to industrial asphalts such as under the Federal Supply Catalogue SS–A–666 covering the purchase of asphalt for built-up roofing, water-proofing and damp-proofing, Type II, Grade 2, the blended compositions of this invention pass those specifications normally made by air-blown asphalts.

Tia Juana asphaltenes were admixed in accordance with this invention with diisooctyl phthalate to produce an asphalt composition consisting of 41 wt. percent DIOP and 59 wt. percent of said asphaltenes. This composition is compared below in Table IV with a conventional air-blown asphalt made from a Tia Juana, Venezuelan crude. It will be noted that the asphaltene-DIOP blend in all respects compare favorably with the conventional material and the Federal Specification.

TABLE IV

| ASTM inspection | Asphaltene DIOP | Air-blown asphalts | Federal spec. |
|---|---|---|---|
| Softening point, ° F | 173 | 173 | 165–190 |
| Penetration at 77° F | 29 | 25 | 20–50 |
| Penetration at 32° F | 20 | 15 | 10+ |
| Penetration at 115° F | 45 | 61 | 100+ |
| Ductility at 77° F | 4.5 | 5.5 | 4+ |
| olatility at 325° F., percent | 0.5 | 0.3 | 1– |

EXAMPLE 4

That blending of asphaltenes with diisooctyl phthalate yields a product similar to that obtained by blending as-

TABLE II

| Properties | ASTM method | Asphaltene-plasticizer blends | | | Asphalt from Lagunillas, Venezuela crude | | | Asphalt from Elk Basin, Wyoming crude | | |
|---|---|---|---|---|---|---|---|---|---|---|
| | | (1) | (2) | (3) | | | | | | |
| Penetration at 77° F | D5–61 | 74 | 90 | 158 | 74 | 90 | 159 | 74 | 90 | 159 |
| Penetration ratio 39.2°/77° | | 101 | 99 | 87 | 36 | 35 | 33 | 27 | 26 | 24 |
| Furol vis. at 275° F | D88–56 | 744 | 505 | 334 | 272 | 178 | 126 | 147 | 120 | 98 |
| Tin film residue, percent original penetration | D1754–63T | 86 | | 86 | 65 | 64 | 61 | 60 | 59 | 57 |

[1] 48 wt. percent asphaltenes and 52 wt. percent diisooctyl phthalate.
[2] 45 wt. percent asphaltenes and 55 wt. percent diisooctyl phthalate.
[3] 40 wt. percent asphaltenes and 60 wt. percent diisooctyl phthalate.

phaltenes with other conventional vinyl resin plasticizers such as diisodecyl phthalate is shown by the following data.

A series of Lagunillas asphaltenes-plasticizer blends were prepared from the above plasticizers, i.e., DIOP and DIDP, and evaluated. The results given below show that on all counts both of the conventional plasticizers impart unusually good temperature susceptibility (penetration ratio) and high resistance to aging and hardening (TFR, percent original).

TABLE V.—ASTM INSPECTION

|  | Asphaltene-DIOP blends | | | Asphaltene-DIDP blends | | |
|---|---|---|---|---|---|---|
| Amount of plasticizer, wt. percent | 40 | 52 | 55 | 40 | 50 | 55 |
| Penetration at 77° F | 27 | 74 | 90 | 25 | 70 | 191 |
| Penetration 39.2°/77° F | 107 | 101 | 99 | 112 | 100 | 100 |
| Softening pt., ° F | 187 | 158 | 130 | 190 | 154 | 134 |
| Thin film res., percent orig | | 86 | 86 | | 88 | 87 |

It is not intended that this invention be limited to the specific examples presented by way of illustration. The scope of the invention is limited only by the appended claims.

What is claimed is:

1. A composition consisting essentially of from about 40 to about 80 wt. percent of asphaltenes and from about 20 ot about 60 wt. percent of an ester having a flash point above about 350° F. and being prepared from a $C_4$-$C_{16}$ alcohol with a $C_4$-$C_{10}$ dibasic acid or phosphoric acid, said composition having greater resistance to hardening or aging, and better temperature susceptibility properties, than a conventional petroleum asphalt of the same ASTM penetration value.

2. A composition according to claim 1 wherein said plasticizer comprises an ester of a $C_4$-$C_{10}$ dibasic acid with a $C_4$-$C_{16}$ alcohol.

3. A composition according to claim 2 wherein said dibasic acid is phthalic acid.

4. A composition according to claim 3 wherein said alcohol is a $C_8$-$C_{14}$ aliphatic monohydric alcohol.

5. A composition according to claim 1 wherein said asphaltenes are present in a concentration within the range between 45 and 60 wt. percent and said plasticizer is present in a concentration within the range between 40 and 55 wt. percent.

6. A composition according to claim 5 wherein said plasticizer is an ester of phthalic acid with a $C_8$-$C_{14}$ aliphatic monohydric alcohol.

7. A composition according to claim 6 wherein said ester is diisooctyl phthalate.

8. A composition according to claim 6 wherein said ester is diisodecyl phthalate.

9. A composition according to claim 1 wherein said plasticizer comprises an ester of adipic acid with a $C_4$-$C_{16}$ alcohol.

10. A composition according to claim 1 wherein said plasticizer comprises an ester of sebacic acid with a $C_4$-$C_{16}$ alcohol.

11. A composition according to claim 1 wherein said plasticizer is an aryl phosphate ester of a $C_6$-$C_{16}$ alcohol.

12. A composition according to claim 11 wherein said phosphate is tricresyl phosphate.

13. A hot-mix asphalt paving composition comprising from about 4 to about 10 wt. percent of the composition of claim 6 and from about 90 to about 96 wt. percent of a mineral aggregate.

References Cited
UNITED STATES PATENTS

| 2,693,425 | 11/1954 | Hardman | 106—273 |
| 2,862,869 | 12/1958 | Illman | 208—23X |
| 2,870,080 | 1/1959 | Illman et al. | 208—23 |
| 2,877,129 | 3/1959 | Hardman | 106—279 |
| 2,909,441 | 10/1959 | Pickell | 106—278X |
| 3,035,930 | 5/1962 | Talley | 106—273 |

JULIUS FROME, Primary Examiner

J. B. EVANS, Assistant Examiner

U.S. Cl. X.R.

208—23